(12) United States Patent
Wright

(10) Patent No.: US 8,550,015 B2
(45) Date of Patent: Oct. 8, 2013

(54) MODULAR TABLE SYSTEM

(75) Inventor: David Wright, Irving, TX (US)

(73) Assignee: Daco, Boonton, NJ (US)

( * ) Notice: Subject to any disclaimer, the term of this patent is extended or adjusted under 35 U.S.C. 154(b) by 0 days.

(21) Appl. No.: 13/519,664

(22) PCT Filed: Dec. 29, 2010

(86) PCT No.: PCT/US2010/062290
§ 371 (c)(1),
(2), (4) Date: Dec. 10, 2012

(65) Prior Publication Data

US 2013/0074744 A1    Mar. 28, 2013

Related U.S. Application Data

(60) Provisional application No. 61/292,018, filed on Jan. 4, 2010.

(51) Int. Cl.
*A47B 3/06* (2006.01)

(52) U.S. Cl.
USPC .......................................... 108/156; 108/64

(58) Field of Classification Search
USPC ......... 108/153.1, 156, 157.1, 157.18, 159.11, 108/159, 158.12, 158, 158.11, 60, 61, 108/50.01, 50.02; 248/188, 188.4, 188.1, 248/188.8
See application file for complete search history.

(56) References Cited

U.S. PATENT DOCUMENTS

| | | | | |
|---|---|---|---|---|
| 2,943,897 A | * | 7/1960 | Johnson et al. | 108/185 |
| 4,731,918 A | * | 3/1988 | Burghardt | 108/156 |
| 5,203,528 A | * | 4/1993 | Oke | 248/188.4 |
| 5,232,303 A | * | 8/1993 | Rubner | 248/188 |
| 5,341,749 A | * | 8/1994 | Noakes | 108/64 |
| 5,435,254 A | * | 7/1995 | Amey et al. | 108/64 |
| 5,528,996 A | | 6/1996 | Edwards et al. | |
| 5,718,179 A | | 2/1998 | Johnson et al. | |
| 5,794,545 A | * | 8/1998 | McDaniel et al. | 108/64 |
| 5,934,203 A | * | 8/1999 | Glass | 108/156 |
| 5,988,077 A | * | 11/1999 | Balderi | 108/64 |
| 6,047,648 A | | 4/2000 | Alm et al. | |
| 6,355,918 B1 | * | 3/2002 | Eckmyre | 108/156 |
| 6,598,542 B2 | * | 7/2003 | Goldberg et al. | 108/64 |
| 7,571,888 B2 | * | 8/2009 | Arozena Bergaretxe | 108/156 |
| 8,091,489 B2 | * | 1/2012 | Karrasch et al. | 108/153.1 |

* cited by examiner

*Primary Examiner* — Jose V Chen
(74) *Attorney, Agent, or Firm* — Hoffmann & Baron, LLP

(57) ABSTRACT

A modular office system for work stations includes at least one generally planar horizontal work top having a work surface and an opposed under surface. A plurality of legs are attached to the work top by a plurality of leg attachment structures. Each leg attachment structure has a first side which is attached to the under surface of the horizontal work top and a second side which is attached to one of the plurality of legs. A horizontal connection member interconnects the leg attachment structure of one work top to a leg attachment structure of another work top. A vertical connection member is attachable to the leg attachment structure and includes a vertically extending portion for securing a panel thereto. The vertical connection member has a slot for passage of the horizontal connection member therethrough to permit attachment of one work top to another work top with the vertical attachment member attached to the leg attachment structure.

5 Claims, 11 Drawing Sheets

MODULAR TABLE SYSTEM

CROSS REFERENCE TO RELATED APPLICATIONS

This application is the National Stage of International Application No. PCT/US2010/062290, which designates the U.S., filed Dec. 29, 2010, which claims the benefit of U.S. Provisional Patent Application No. 61/292,018 filed on Jan. 4, 2010, the contents of all of which are incorporated herein by reference in their entirety.

FIELD OF THE INVENTION

The present invention is a modular table system. In particular, the present invention relates to a modular table system for office work stations that can be easily assembled and easily expanded by adding additional modules.

BACKGROUND OF INVENTION

Tables come in various shapes and sizes and have a wide variety of uses. In general, tables include a flat planar surface (i.e., the table top) that is supported by a plurality of legs, typically four. The size of the table top can vary but commercially available tables generally are available within a limited range of sizes. If a non-standard size table is required, it typically has to be specially made at an added cost and delayed availability. Moreover, tables can often have different optional features that can be selected by the purchaser. The addition of optional features usually delays the shipment of the table to the customer.

Businesses often need tables having different sizes and configurations for office work stations. Because the requirements may change, it is desirable to have tables that can be easily added onto or modified in a short period of time. It is also desirable to have the office work stations formed as modular systems to facilitate reconfiguration of the design in the minimum amount of time. Accordingly, there is a need for a modular table system that can be easily constructed to provide tables having a wide variety of sizes, shapes and optional features and that can be easily reconfigured.

SUMMARY OF THE INVENTION

In accordance with the present invention, a modular system for office work stations is provided. The modular system includes at least one generally planar horizontal work top, a plurality of legs, a plurality of leg attachment structures, at least one horizontal connection member and at least one vertical connection member.

The generally planar horizontal work top (also referred to herein as a table top) has a work surface and an opposed undersurface. Each of the plurality of legs has a first end that is attached to the opposed undersurface of the work top and a second end that contacts the floor. Each of the plurality of leg attachment structures includes a first side and a second side. The first side is attached to the opposed undersurface of the horizontal work top and the second side is attached to one of the plurality of legs. The horizontal connection member is used to interconnect one of the leg attachment structures of at least one work top to a leg attachment structure of another work top. The vertical connection member is attached to the leg attachment structure and includes a vertically extending portion. Typically, two vertical connection members are attached on one side of the table top and a panel is secured between the two vertically extending portions. The vertical connection member has a slot which allows passage of the horizontal connection member therethrough to permit attachment of two work tops with the vertical attachment member attached to the leg attachment structure.

Each of the plurality of leg attachment structures includes a cap and a connection plate. The cap includes a planar member having a work top attachment surface, an opposed leg attachment surface and a perimetrical side wall. The perimetrical side wall of the cap includes a recess for receiving the horizontal connection member between the planar member of the cap and the opposed undersurface. The connection plate is attached to the first end of one of the legs. The leg attachment surface of the cap includes a cavity that is defined by the perimetrical side wall and receives the connection plate. After the plate is positioned in the cavity, it is secured to the cap by fasteners, such as screws or bolts.

BRIEF DESCRIPTION OF THE FIGURES

The preferred embodiments of the modular table system of the present invention, as well as other objects, features and advantages of this invention, will be apparent from the accompanying drawings wherein.

DETAILED DESCRIPTION OF THE INVENTION

Figure 1:
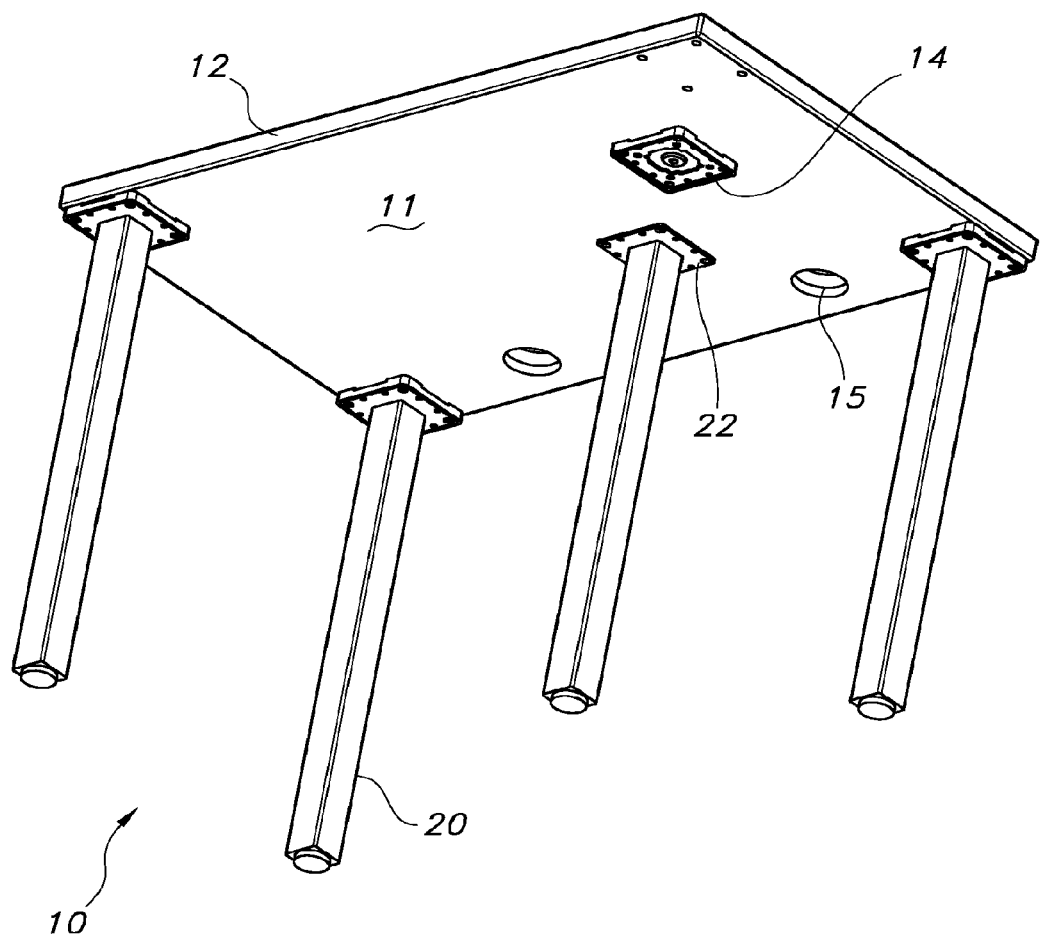
FIG. 1 is a perspective view of the underside of a table module showing the connection of the legs.

The present invention is a modular table system that allows a wide variety of table designs to be constructed from a plurality of modular components. The system allows the modular assembly of office desks/tables where the tables can be interconnected and accessory components can be attached thereto. The system uses mechanical connections to attach legs and table-to-table connectors, including connectors that allow attachment of privacy screens and modesty panels.

In its most basic form, the modular table system is a table module that includes a generally planar horizontal work top (also referred to herein as a table top) connected to four legs using leg attachment structures. Each of the leg attachment structures includes a connection plate attached to the end of a table leg and a cap that is secured to the bottom surface of the table top at one of the four corners. The connector plate is preferably welded to the end of the leg and the connection plate is fastened to the cap using well know fastening devices, including different types of screws or bolts. The caps have a base plate with two surfaces and four sides and are substantially rectangular in shape, preferably square. The top surface contacts the bottom surface of the table top and is substantially flat except for four posts near the corners that extend away from the surface and four recesses. The posts are inserted into holes drilled in the bottom surface (also referred to herein as the undersurface) of the table top to prevent the cap from moving out of position. Mounting screws are then inserted in a plurality of apertures in the cap and tightened to secure the cap to the bottom surface of the table top. A recess is formed in the top surface of the cap on each of the four sides. As more fully described below, these recesses receive horizontal connectors that are used to connect two table modules together.

The bottom surface of the cap has a perimetrical edge that extends away from the bottom surface and forms a cavity. The cavity is designed to receive the plate attached to the end of the leg. The base plate of the cap and the plate on the leg each have a plurality of corresponding apertures that are used to fasten the leg to the cap.

The caps are located at the corners of the table top so that two sides of the cap are located along two adjacent sides of the table top. The recesses in the sides of the cap receive connectors that are used to attach adjoining table tops. The connectors are rectangular and substantially flat with one or more apertures on each end. These apertures correspond to apertures in the connection plate and the base plate of the cap and are used to secure the connector in the recess. The connectors allow the user to add any number of table tops together to form a large table surface in a wide variety of sizes and shapes. Before two tables are joined, the connectors are inserted in the recesses of the caps of one of the tables and secured using fasteners, typically screws or bolts. The two tables are then positioned next to each other so that the recesses in the caps of the two tables are aligned. The tables are then moved together so that the unattached ends of the connectors are inserted into the recesses of the caps on the opposing table. The apertures are aligned and fasteners installed to secure the connector to the second table. The adjacent tables form a continuous table top surface. Additional tables can be added as desired by the user using the connectors and following the same procedure.

The modular nature of the system and the various components, including modesty panels, privacy panels and the like, allow the construction of various arrangements of tables and desks without having to maintain an inventory of different pre-constructed furniture configurations. The cap component and the accessory connectors and brackets allow modular assembly of different components to form user selected configurations that can be easily modified.

Figure 11:
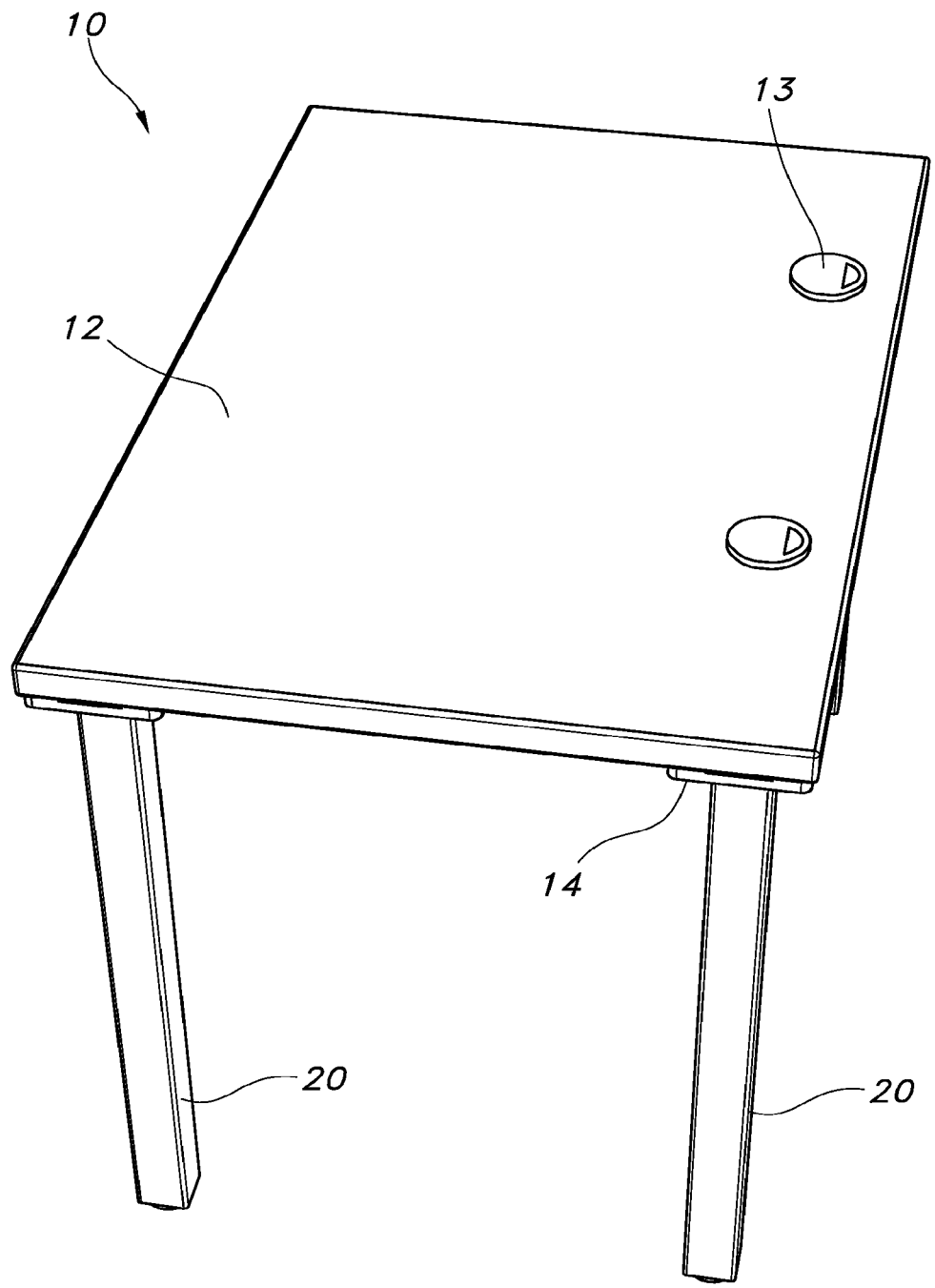
FIG. 11 is a photograph of perspective end view of an assembled table module.

The invention is further described with reference to the accompanying drawings and photographs. FIG. 1 is a perspective view of the bottom of a table module 10 showing the connection of the legs 20 to the undersurface 11 of the generally planar horizontal work top, i.e., the table top 12. The legs 20 have a connection plate 22 on one end, which is attached to a cap structure 14 (also referred to as "the cap") that is secured to the undersurface 11 of the table top 12 at each corner. The table legs 20 and plates 22 are preferably made of metal and welded together. However, legs 20 and plates 22 made of plastic or composite materials are also within the scope of the invention and for these embodiments, the plate 22 can be attached to the leg 20 using an adhesive or mechanical fastening device, such as screws or clips. The leg 20 and cap 22 can also be formed as a single structure using an extrusion or molding method. The table top 12 can have one or more openings 15 that can be used for the passage of cables and electrical power cords. When not in use, the openings 15 can be sealed with removable filler plates 13 (FIG. 11).

Figure 2:
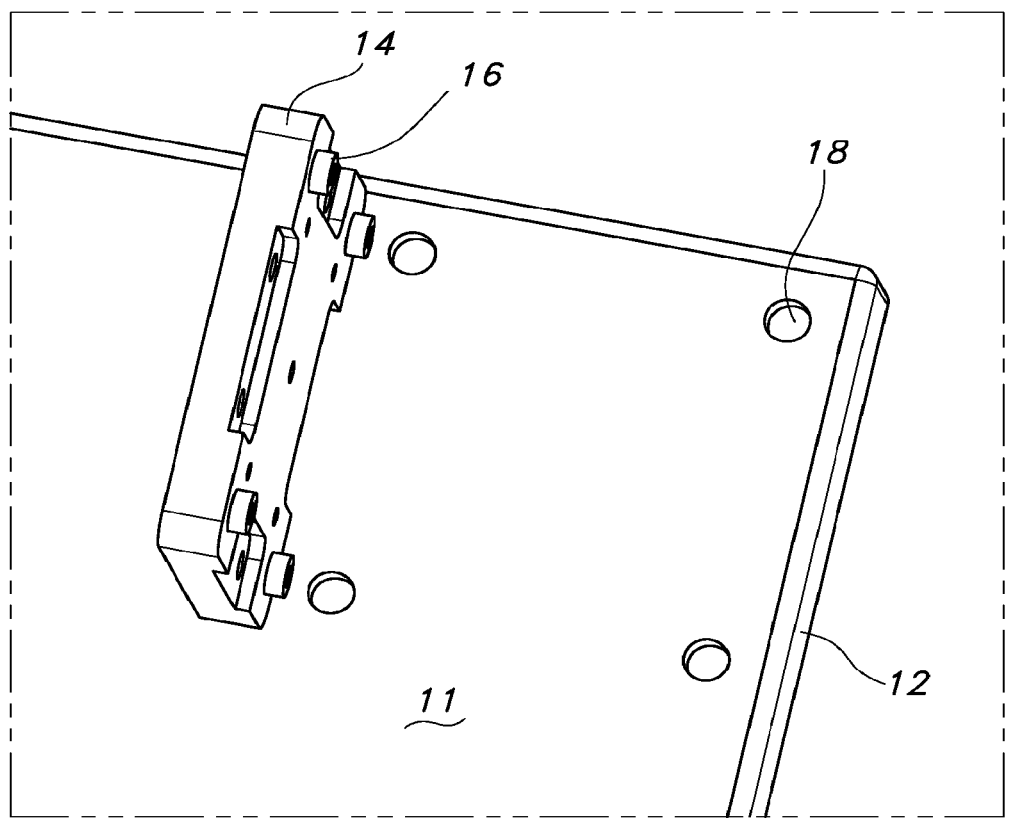
FIG. 2 is a photograph showing the underside of the table top with holes for receiving the leg attachment cap.

FIG. 2 is a photograph showing the undersurface 11 of the table top 12 with holes 18 that do not pass through to the top surface of the table top 12. These holes 18 are aligned with and used for receiving the posts 16 that extend from the surface of the cap 14. After the posts 16 are positioned in the holes 18, the cap 14 is secured to the undersurface 11 of the table top 12 with screws 17 (see FIG. 13).

Figure 3:
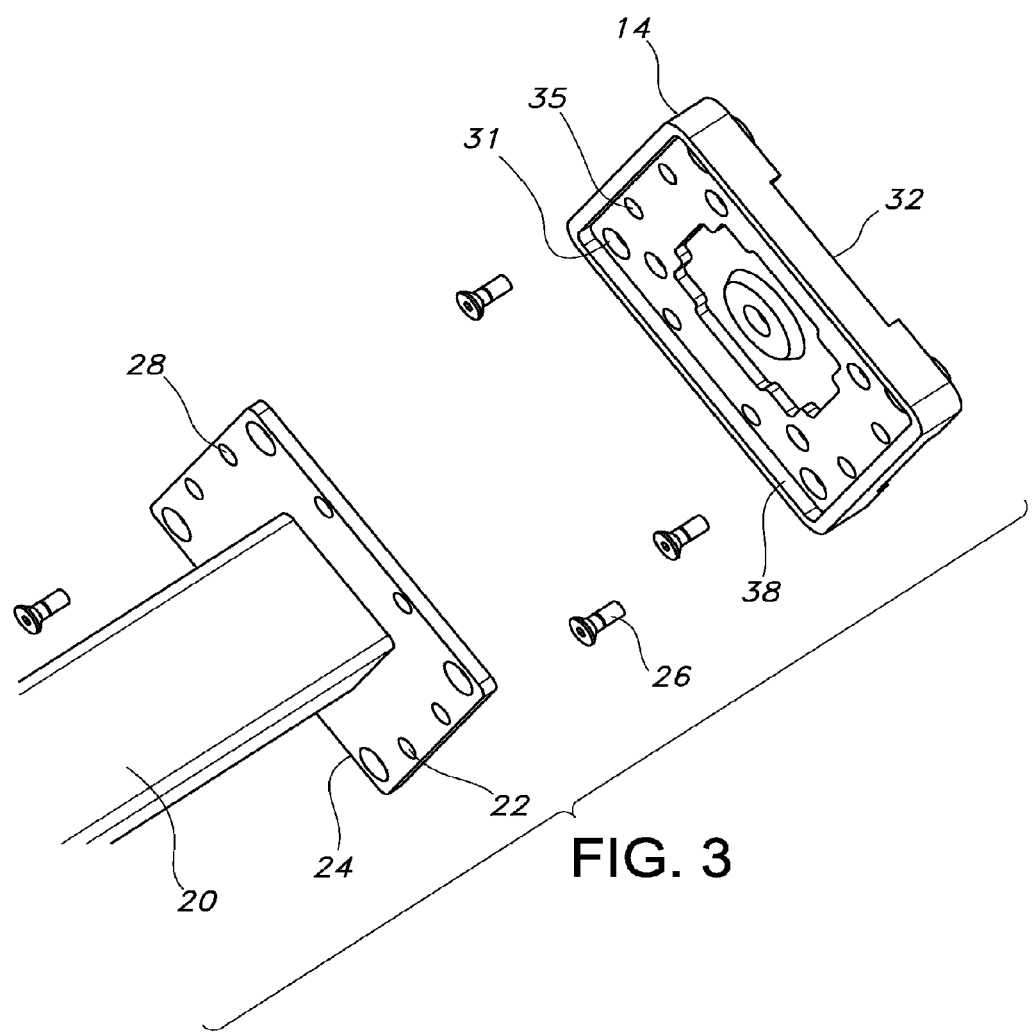
FIG. 3 is a perspective exploded view of a table leg and the leg attachment structure that includes the connection plate and the cap.

FIG. 3 is a perspective, exploded view of a table leg 20 and the leg attachment structure (i.e., the connection plate 22 and the cap 14). The connection plate 22 is attached to the leg 20. After the cap 14 is secured to the undersurface 11 of the table top 12, the connection plate 22 is attached to the cap 14 with screws 26, which pass through unthreaded apertures 24 in the plate 22 and threaded into tapped (i.e., threaded) apertures 31 in the cap 14. The plate 22 also has other unthreaded apertures 28 that are used to attach horizontal connectors 30, 34 as discussed in more detail below with respect to FIGS. 5 and 6. The cap 14 also has a perimetrical side wall 38 that corresponds to the dimensions of the connection plate 22 and secures the plate 22 in position.

Figure 4:
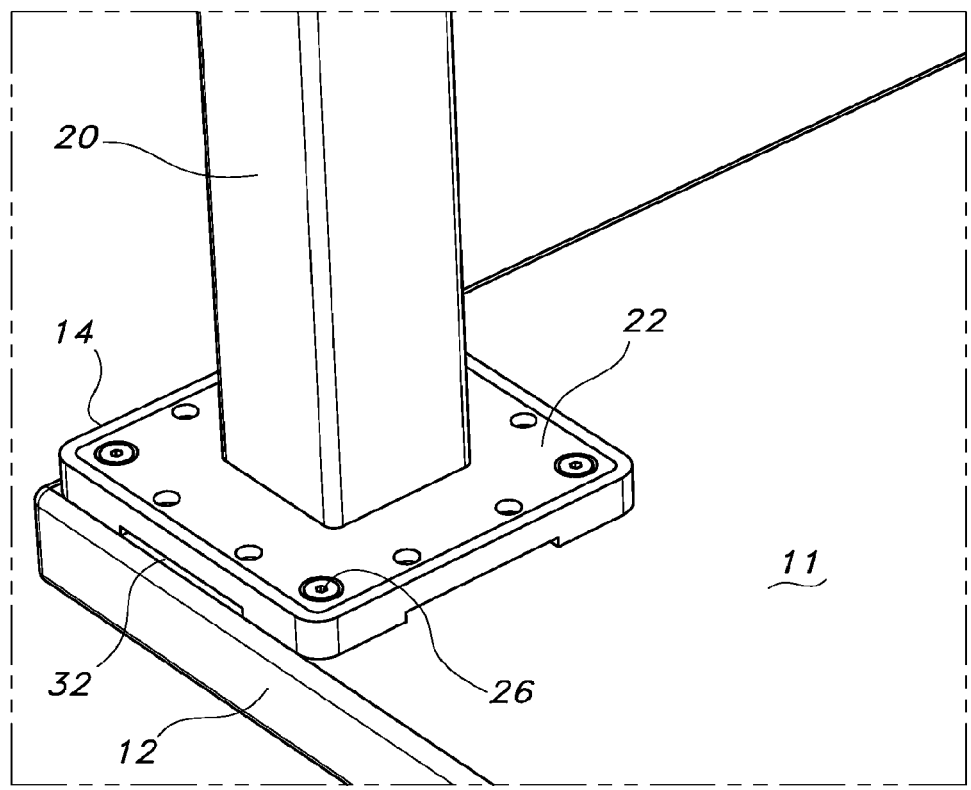
FIG. 4 is a photograph showing a leg attached to the undersurface of a table top by the leg attachment structure.

FIG. 4 is a photograph showing a leg 20 attached to the undersurface 11 of a table top 12 by connecting the connection plate 22 to the cap 14 using hex socket screws 26. Other types of screws and bolts can also be used. In preferred embodiments, screws 26 are used and the apertures 24 (FIG. 3) in the connection plate 22 are beveled so that the head of the screw 26 is even with or below the surface of the plate 22 as shown in FIG. 4. This figure also shows how the cap 14 and the recess 32 are aligned with the edge of the table top 12. When two table modules 10 are joined, the recess 32 is used to connect the two table modules 10 as described below with respect to FIGS. 5 and 6.

Figure 5:
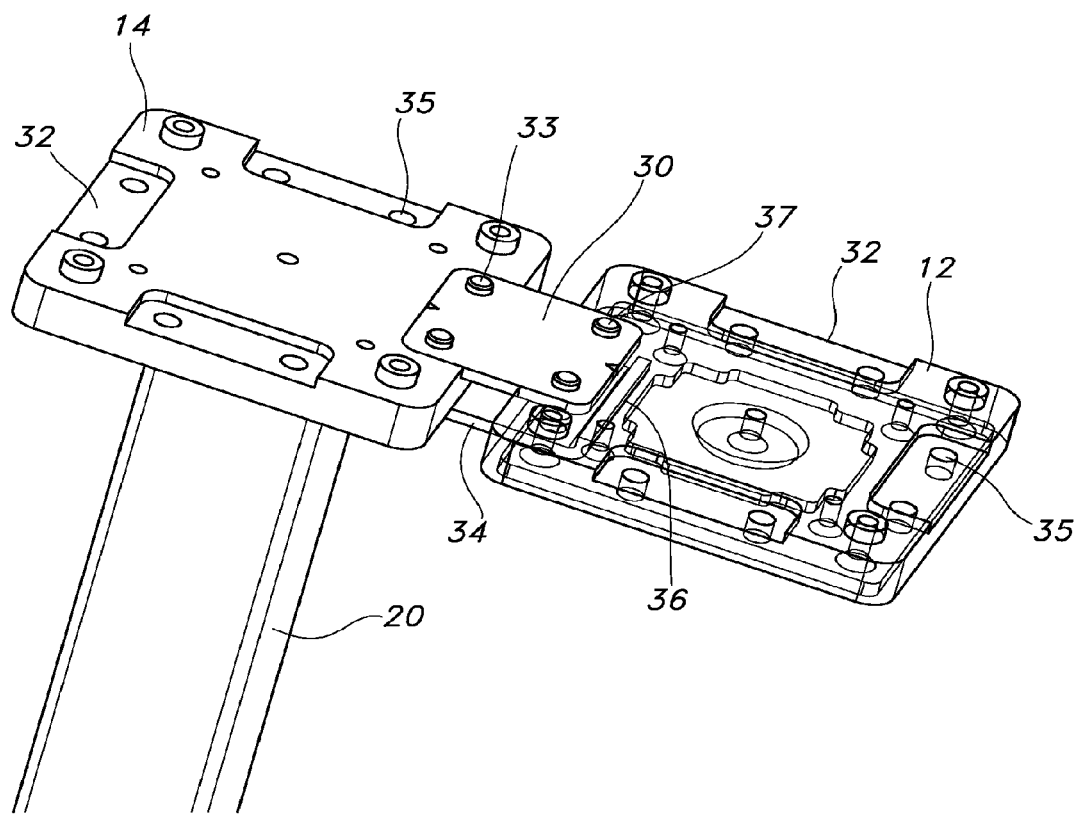
FIG. 5 is a top perspective view of a table leg with a leg attachment structure connected to a second leg attachment structure by a top horizontal connector.

FIG. 5 is a top perspective view of a table leg 20 with a leg attachment structure (i.e., a connection plate 22 and cap 14) connected to a second leg attachment structure by a top horizontal connector 30 and a bottom horizontal connector 34. The top connector 30 is inserted into the recess 32 after the caps 14 are attached to the undersurface 11 of a table top 12 and the threaded apertures 37 in the top connector 30 are aligned with the unthreaded apertures 28, 35 in the connector plate 22 and the cap 14.

Figure 6:
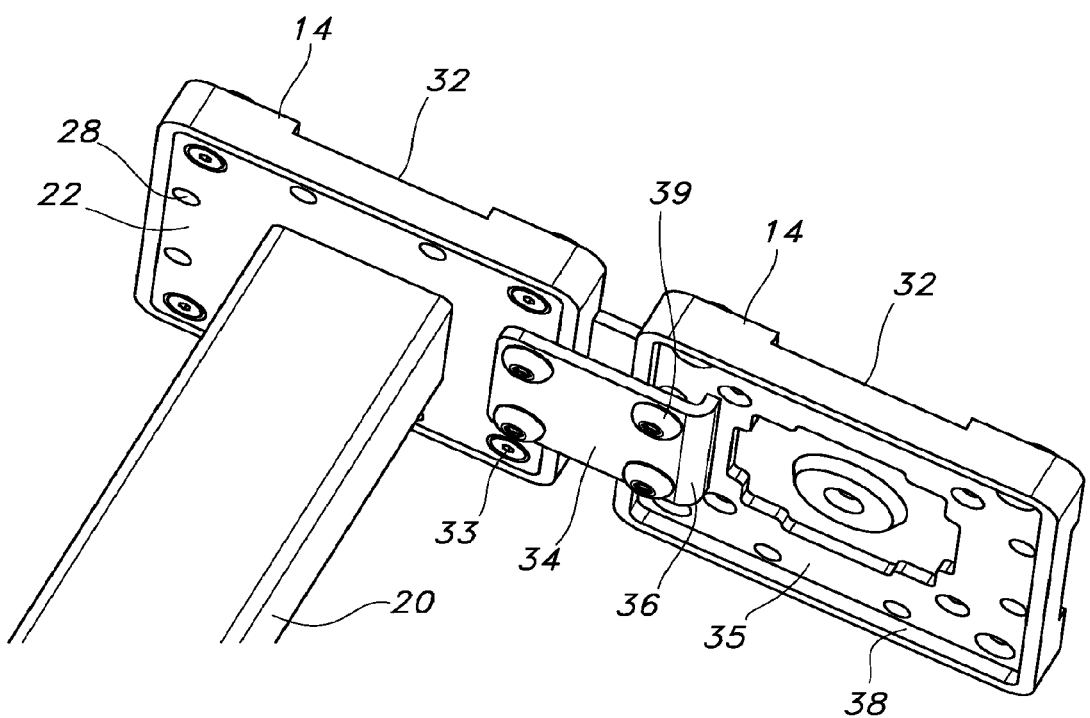
FIG. 6 is a bottom perspective view of a table leg with a leg attachment structure connected to a second leg attachment structure by a bottom horizontal connector.

FIG. 6 is a bottom perspective view of the table leg 20 and two leg attachment structures shown in FIG. 5. The bottom horizontal connector 34 is positioned over the connector plate 22 on one side so that a pair of unthreaded apertures 28 in the connector plate 22 aligns with the unthreaded apertures 39 in the bottom connector 34. On the other side, a leg with a connector plate is not connected to the cap 14 and the end of the bottom connector 34 has a member 36 that extends upwardly and offsets the bottom connector 34 from the surface of the cap 14. This allows the surface of the bottom connector 34 to remain parallel with the surface of the connection plate 22. When a connection plate 22 is connected to the cap 14 on both ends of the bottom connector 34, the bottom connector 34 is turned over so that the member 36 extends away from the connector plates 22. The bottom horizontal connector 34 is positioned over the cap 14 and the unthreaded apertures 39 are aligned with the unthreaded apertures 35 in the cap 14. Four screws 33 pass through unthreaded apertures 39, 28, 35 and are screwed into the threaded apertures 37 in the top connector 30. After the screws 33 are tightened, the two adjacent table modules 10 are securely connected together. The top and bottom horizontal connectors 30, 34 allow various arrangements of multiple tables to be connected.

The top and bottom horizontal connectors 30, 34 allow various arrangements of multiple tables to be connected.

Figure 7:
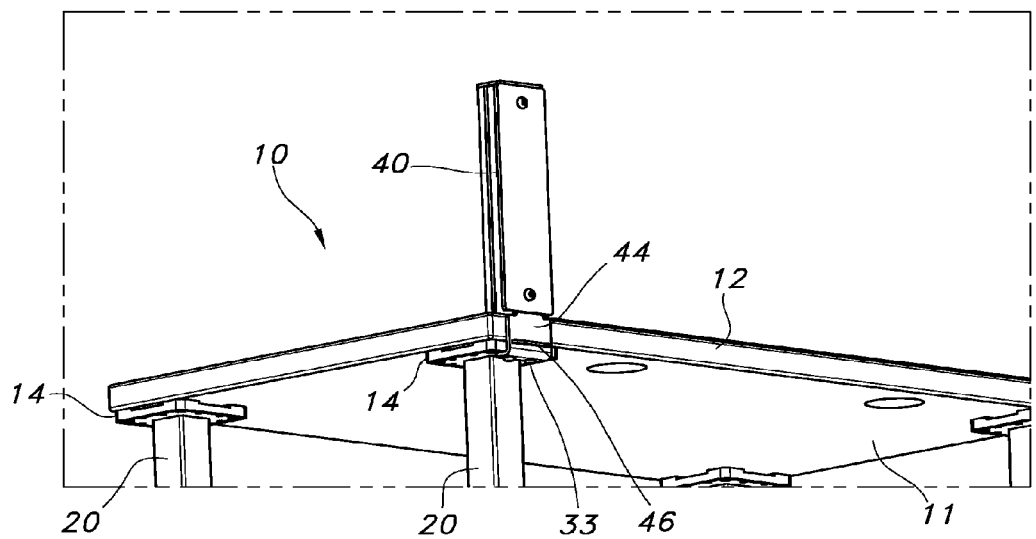
FIG. 7 is a perspective side view of a table module with a vertical connection bracket connected to a leg attachment structure of the table.
Figure 8:
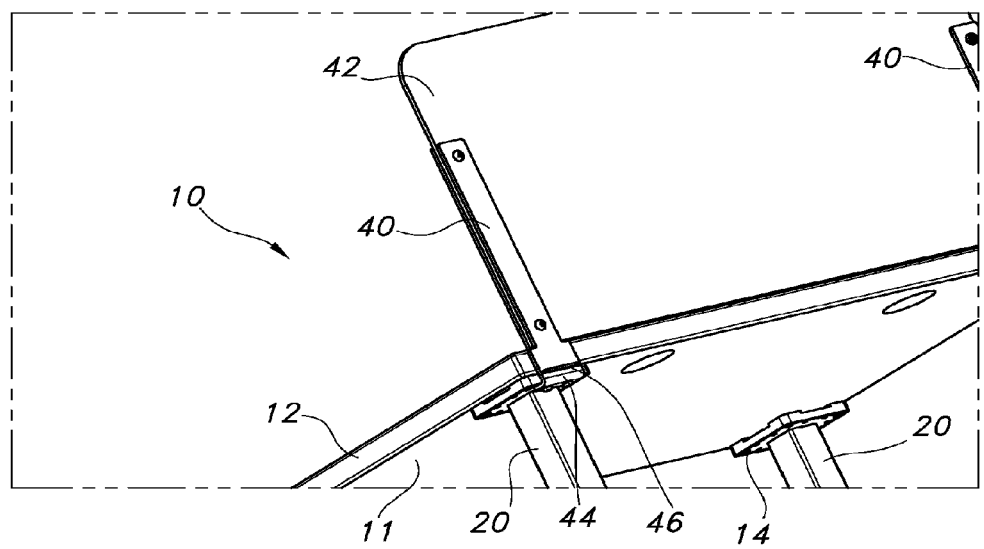
FIG. 8 is a perspective side view of a table module with two vertical connection members securing a panel to the table top.

FIGS. 7 and 8 show a table module 10 with a vertical connection bracket 40 connected to a cap 14. The connecting end 44 of the bracket 40 forms a right angle and is secured to the cap 14 by a pair of screws 33. The connecting end 44 also has a slot 46 that is aligned with the recess 32 in the cap 14. A connector (not shown) with two unthreaded apertures can be inserted in the slot so that the apertures align with the apertures 35 in the cap 14 (FIG. 6). The connector is secured in place when the screws 33 are tightened. FIG. 8 shows the table module 10 with two vertical connection brackets 40 used to support a privacy panel 42 on the work surface of the table top 12.

Figure 9:
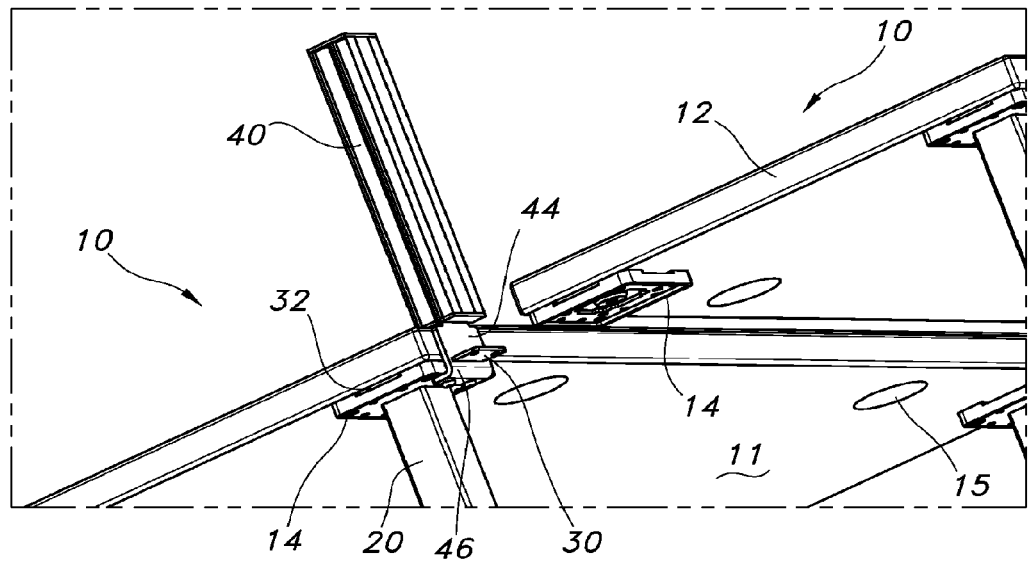
FIG. 9 is a perspective side view of two table modules being joined by a vertical connection member connected to the leg attachment structure of one table and a horizontal connector extending through the vertical connection member to the leg attachment structure of the second table.

FIG. 9 shows two table modules 10 being joined together and a vertical connection bracket 40 attached to the cap 14 on one table top 12. In addition, FIG. 9 shows a horizontal connector 30 passing through the slot 46 in the connecting end 44 of the bracket 40. When the two table modules 10 are joined together, the opposing ends of the connector 30 are inserted into the recesses 32 of the opposing caps 14 of the two table modules 10. The connecting end 44 of the bracket 40 is secured to the cap 14 on one side and, on the other side, the horizontal connector 30 is secured to the cap 14 on the second table module 10.

Figure 10:
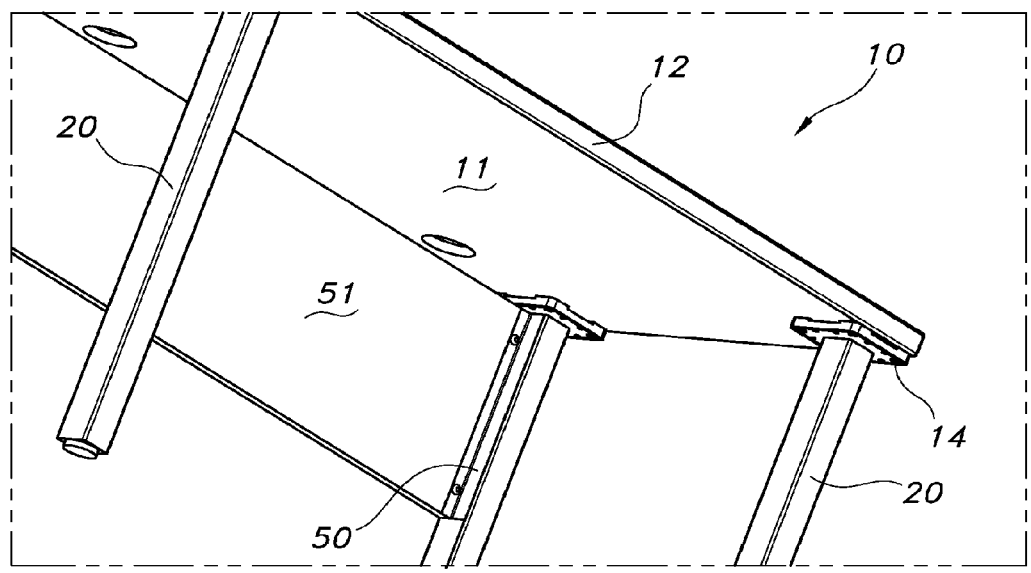
FIG. 10 is a perspective bottom view of a table module with a modesty panel under the table top that is attached to two legs.

FIG. 10 shows a table module 10 with a modesty panel 52 attached under the table top 12 between two legs 20 using brackets 50 attached to the legs 20. Again, the brackets 50 are attached to the caps 14. When one or more the modesty panels 52 are used in combination with one or more of the privacy panels 42 shown in FIG. 8, a work station is created that provides a private work space.

FIG. 11 is a photograph of an assembled table module 10 and shows a pair of legs 20 attached to a pair of caps 14 on one end of the table top 12. The openings 15 (FIG. 1) in the table top 12 are sealed with removable filler plates 13.

Figure 12:
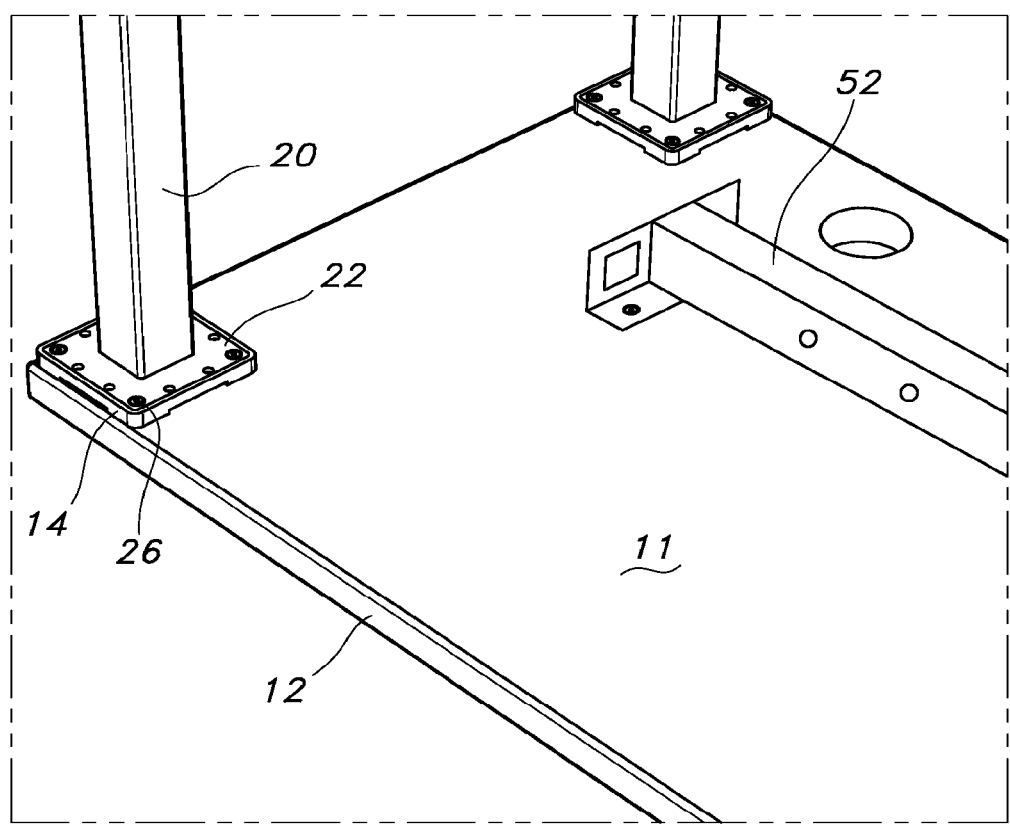
FIG. 12 is a photograph of the undersurface of a table top with legs attached using leg attachment structures.

FIG. 12 is a photograph of the undersurface 11 of a table top 12 with a pair of legs 20 attached by connecting the connection plates 22 to the caps 14. FIG. 12 also shows the bracket 50 used to attach the modesty panel 52 shown in FIG. 10 lying on the undersurface 11 of the table top 12.

Figure 13:
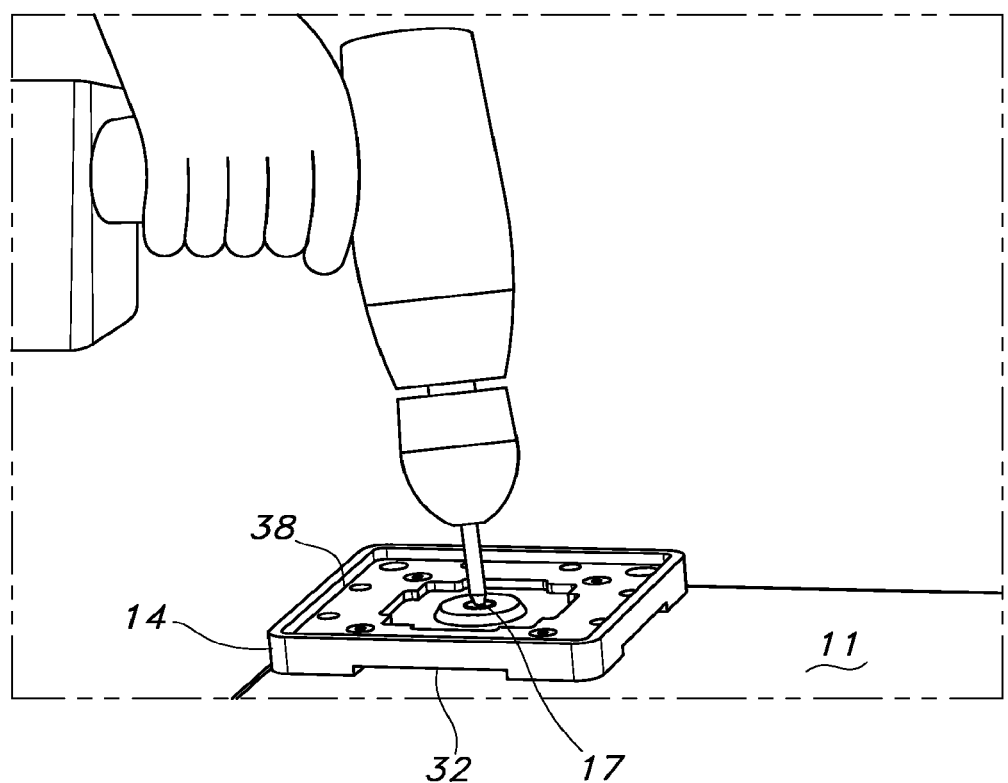
FIG. 13 is a photograph showing a cap being attached to the undersurface of a table top using screws.

FIG. 13 is a photograph showing a cap 14 being attached to the undersurface 11 of a table top 12 at one of the corners using screws 17. The cap 12 includes projecting posts 16 (FIG. 2), which fit into aligned holes 18 in the undersurface 11 of the table top 12. Preferably, wood screws 33 are used to secure the cap 14 to the undersurface 11.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A modular system for office work stations comprising:
    at least one generally planar horizontal work top having a work surface and an opposed undersurface;
    a plurality of legs;
    a plurality of leg attachment structures, each leg attachment structure having a first side and a second side, wherein said first side is attached to said opposed undersurface of said horizontal work top and said second side is attached to one of said plurality of legs;
    at least one horizontal connection member for interconnecting said at least one of said plurality of leg attachment structures of at least one work top, to a leg attachment structure of another work top; and
    at least one vertical connection member for attachment to said leg attachment structure, said vertical connection member including a vertically extending portion extending vertically with respect to said horizontal work top for securing a panel to said vertical connection member, said vertical connection member having a slot for passage of said horizontal connection member therethrough to permit attachment of said one work top to said another said work top with said vertical attachment member attached to said leg attachment structure.

2. The modular system according to claim 1, wherein each of said plurality of leg attachment structures comprises a cap and a connection plate.

3. The modular system according to claim 2, wherein each said cap comprises a planar member having a work top attachment surface, an opposed leg attachment surface and a perimetrical side wall.

4. The modular system according to claim 3, wherein said perimetrical side wall of said cap includes a recess for receiving said horizontal connection member between said planar member of said cap and said opposed undersurface.

5. The modular system of claim 3, wherein said connection plate is attached to a first end of one of said plurality of legs, and wherein said leg attachment surface of said cap includes a cavity for receiving said connection plate.

\* \* \* \* \*